INVENTORS
ROGER B. JONES
EDGAR J. SCHMIDT
BY
AGENT

United States Patent Office 3,150,311
Patented Sept. 22, 1964

3,150,311
APPARATUS FOR DETECTING HEAT PROTECTED AGAINST FALSE ACTUATION
Roger B. Jones, North Caldwell, and Edgar J. Schmidt, West Caldwell, N.J., assignors to Specialties Development Corporation, Belleville, N.J., a corporation of New Jersey
Filed Apr. 19, 1960, Ser. No. 23,263
2 Claims. (Cl. 323—69)

The present invention relates to apparatus for detecting heat due to abnormal temperature conditions, and more particularly to an arrangement which minimizes the effects of moisture on heat detecting elements to prevent false actuation of the apparatus.

The present invention, although useful for many purposes, is primarily concerned with utilizing, an elongated heat detecting element comprising two conductors within a metallic sheath and spaced apart by a thermistor material which has a negative temperature coefficient of resistivity and decreases in resistance to a predetermined value in the presence of a heat condition to be detected.

These elements are provided with connectors at the ends thereof for connecting the conductors in the element to a cable from an indicating circuit. Also, to facilitate installation in cramped locations, through bulkheads, etc., the elements are normally made in sections which are joined together by connectors to provide a continuous electrical connection between the conductors in each of the sections. These connectors are not air tight and therefore vapors and mists of water and other liquids, if present in the atmosphere to which the connectors are subjected, enter the connectors and contaminate the contacts and surfaces therein, thereby creating current paths between the contacts in parallel with the thermistor material separating the conductors of the element.

In the apparatus previously used for monitoring the resistance of the thermistor material, the current paths provided within the connectors by the contaminating fluids were of such low resistance that they frequently caused false alarms to be given. This prior apparatus converted changes in the resistance of the element into changes in voltage by connecting the element in series with a constant resistance across an electrical source, and monitoring the voltage across the element to actuate an alarm when this voltage indicated that the thermistor resistance had decreased to a predetermined value. In this apparatus, only the proportion of the supply voltage which was impressed across the element was considered to be of interest and the actual voltage impressed across the element when it assumed the fire indicating value ranged upward from two volts.

The manufacturers of commercial systems attempted to solve the problem of false alarms due to moisture by utilizing thermistor elements which assume a very low value in the presence of the temperature to be detected in an effort to place the fire indicating resistance of the element below the resistance of moisture to thereby reduce the shunting effect of the moisture. Although the fire indicating resistances of such elements have been reduced to below 100 ohms in available systems utilizing both direct current source and alternating current sources, these systems are still susceptible to false alarms due to moisture.

The present invention resulted from the discovery that the system disclosed in United States Patent No. 3,038,106, although intended to carry out the previously known method, was amazingly insensitive to moisture when utilizied in connection with a ten volt direct current source and a thermistor element having a fire indicating resistance of 700 ohms.

Experiments were conducted to determine the cause of this moisture insensitivity so that this quality might be reproduced in other systems. It was found that the very low direct current potential, impressed across the thermistor element at its fire indicating resistance by the system of the above mentioned patent when utilized under the above stated conditions, caused any connectors containing a conductive solution to polarize and produce a high resistance through the solution (compared to that at higher potentials) which increased further with time. It was determined (1) that connectors contaminated with conductive solutions became polarized when subjected to a direct current potential of less than about 1.2 volts, (2) that within the range of polarizing potentials the resistance of conductive solutions are not dependent upon concentration and increase rapidly with decreases in potential, and (3) that with potentials greater than 2.0 volts the resistance of the solutions decreases with increasing potentials at a rate dependent upon the concentration thereof.

Accordingly, an object of the present invention is to provide an improved apparatus for detecting a condition which is not subject to the prior difficulties and objections.

Another object is to provide such apparatus capable of detecting a predetermined resistance of the condition sensing element in the presence of conductive moisture shunting the element.

Another object is to provide such apparatus for use in conjunction with an element having a negative temperature coefficient of resistivity and being shunted by a conductive fluid.

A further object is to provide such apparatus which is simple and economical in construction.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

FIG. 3 is a schematic diagram of a network utilized to carry out the method of the present invention in which the detecting element is represented by its equivalent circuit.

Figure 1:
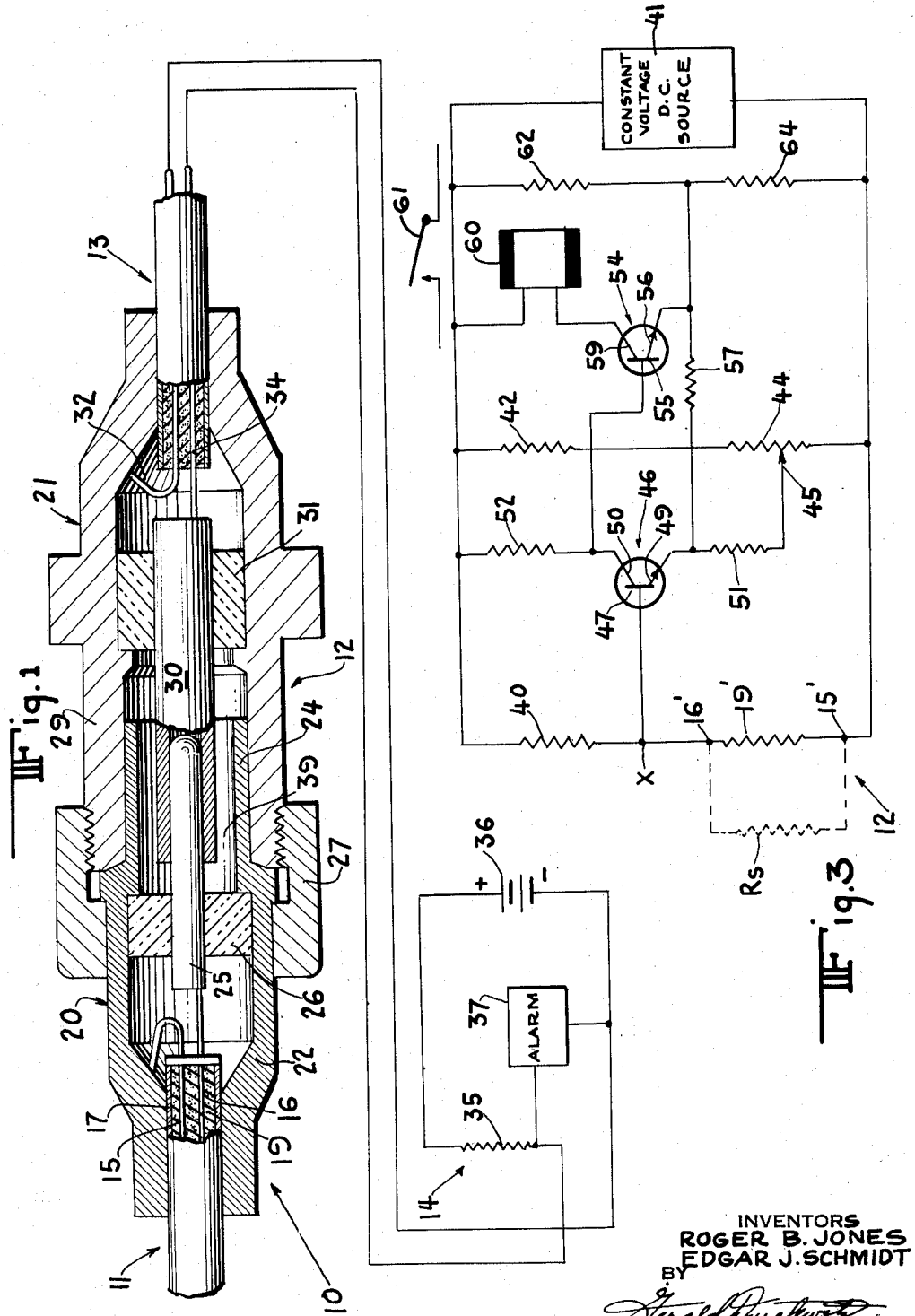
FIG. 1 is a longitudinal sectional view of a portion of a detecting element provided with connectors and connected to a resistance monitoring network.

Referring to FIG. 1 of the drawings in detail, there is shown a portion of a standard fire detecting element 10 including a fire detecting cable 11 provided with a connector 12 for electrically connecting the cable 11 to a lead cable 13 which extends to a resistance monitoring network 14.

The detecting cable 11 comprises two electrically conductive uninsulated wires 15 and 16 positioned within an electrically conductive bendable tube 17 and spaced from each other and from the inner wall of the tube 17 by a mass of thermistor material 19 having a negative temperature coefficient of resistivity. The resistance of the material 19, therefore, decreases in electrical resistance with increases in temperature, and is designed to assume a predetermined resistance in the presence of a temperature indicating the existence of a fire or high temperature.

The connector 12 generally comprises a plug member 20 and a mating socket member 21. The plug member 20 includes an electrical conductive tubular member 22 mounted at one end thereof on the tube 17 and having an annular contact 24 on the other end thereof, a pin 25 mounted within the member 22 and spaced therefrom by a ceramic insulating sleeve 26, and an internally threaded coupling nut 27 rotatably mounted on the member 22 to couple the socket member 21 to the plug member.

The socket member 21 includes an outer electrically conductive tubular member 29 mounted at one end thereof on the lead cable 13 and formed at the other end thereof to receive the annular contact 24, and an inner tubular member 30 for receiving the pin 25 mounted within the member 29 and insulated therefrom by a ceramic insulating sleeve 31.

The conductors 15 and 16 of the detecting element are respectively connected to the member 22 and the pin 25 of the plug member 20, and the cable 13 includes a pair of conductors 32, 34 connected respectively to the members 29, 30 to place the conductor 29 in electrical communication with the conductor 15 and the conductor 30 in electrical communication with the conductor 16.

The network 14 includes a resistance 35 connected in series with a direct current source 36 across the conductors 32, 34 to impress a positive potential on the conductor 16 through the conductor 34, the member 30, and the pin 25, and a negative potential on the conductor 15 through the conductor 32; and an alarm unit 37 is connected across the conductors 32, 34 to monitor the voltage across the members 29 and 22. As the resistance across the conductors 32, 34 decreases the voltage thereacross also decreases, and, when it reaches a predetermined value, the alarm 37 is actuated.

If the interior of the connector 12 is dry, the only current path between the conductors 32 and 34 is through the thermistor material 19, and the network 37 gives an indication only when the resistance of the material drops to the unwanted temperature condition indicating value. However, there is a space 39 within the connector between the outer members 22, 29 and the inner pin 25 and the member 30 which is in communication with the outside atmosphere through minute spaces existing between the contact 24 and the member 29 and between the engaging threads on the nut 27 and on the member 29. Moisture is therefore able to enter the connector, particularly when the connector is subjected to rapid changes in ambient pressure (for instance when installed in an aircraft) causing air to flow into and out of the connector as the pressure therein equalizes with the ambient pressure. If the moisture so introduced contains dissolved impurities and is in sufficient quantity to either fill the chamber or coat the surfaces thereof ionization takes place, and an electrical current path is established between the outer members 22, 29 and the inner members 25, 30 in parallel with the thermistor material 19.

Since the current paths through the moisture and the material 19 are in parallel, the presence of the moisture will not appreciably affect the total resistance appearing across the conductors 32, 34 when the material 19 is at its indicating resistance provided that the resistance of the moisture is high with respect to this fire indicating resistance.

It has been determined that the resistance of a conductive solution varies inversely with the voltage impressed thereacross and when this voltage is low, polarization takes place at the voltage applying electrodes to create a high resistance which is independent of the concentration of the dissolved impurities in the solution. At higher voltages, this polarization breaks down and the resistance of the solution depends on both the potential applied and the concentration of the solution.

Figure 2:
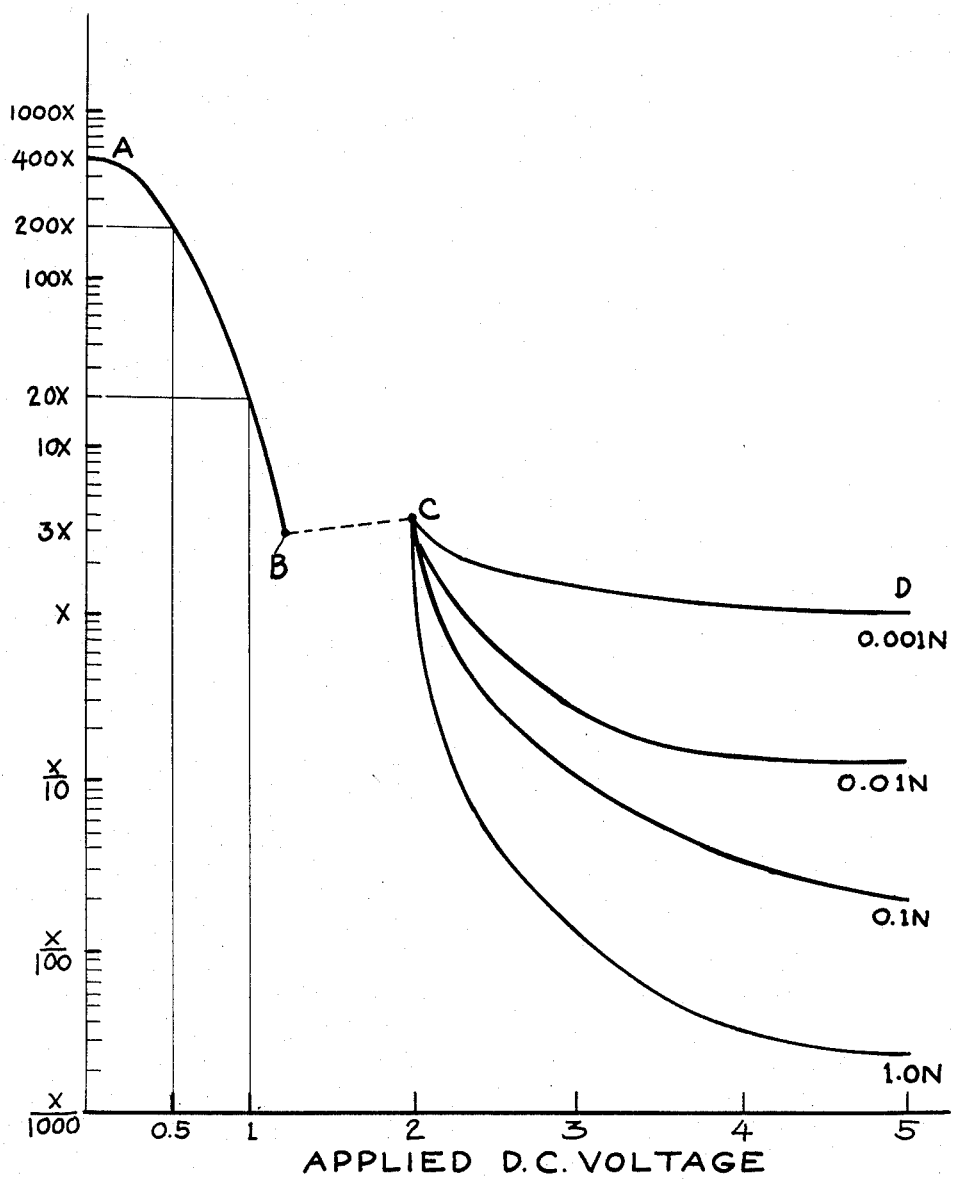
FIG. 2 is a graph illustrating the relationship between the resistance of conductive solutions and the direct current voltage applied thereto.

In FIG. 2, a graph is shown illustrating the relationship of applied voltage to resistance for four aqueous solutions of sodium chloride having concentrations of 0.001, 0.01, 0.1, and 1.0 normal solution. The resistances of the solutions are represented logarithmically along the ordinate of the graph while the applied voltage is represented linearly along the abscissa.

In the region from points A to point B all of the solutions are polarized and exhibit substantially the same resistances. Between the points B and C there is a transition region wherein the resistance of the solution is unpredictable. At the voltage of point C, polarization breaks down and from this point the resistance of the solutions decreases with increased potentials depending upon the concentration of the solutions.

The actual resistance of conductive solution within any one connector at any particular voltage is dependent upon the areas of the energized surfaces therein in contact with the conductive solution. The total resistance of the conductive paths in an element composed of sections joined by the connectors also depends upon the number of connectors which are contaminated.

It thus can be seen from FIG. 2 that the total resistance of a 0.001 normal solution when 1 volt is impressed across the element is 20 times the total resistance of the same solution when the potential across the element is 5 volts, and that at 0.5 volt the resistance is 200 times the 5 volt resistance.

It is therefore highly desirable that the voltage impressed across the element when the thermistor material approaches its indicating resistance is as far below 2 volts as possible to cause the conductive solution to have the highest possible resistance and therefore the least effect upon the total resistance seen by the resistance monitoring network.

Since the voltage impressed across the conductors 32, 34 when in the absence of moisture is high when the resistance of the thermistor material is high, it would be expected that moisture introduced under such conditions would cause a very low resistance, at least momentarily, because of the high voltage, and a false alarm would result, even though the voltage impressed across the conductive solution is within the polarizing range when the thermistor material is at its indicating resistance. It has been found however that this does not occur and the following is believed to be a reasonable explanation for this phenomenon.

The connectors are reasonably tight fitting wherefore moisture must enter therein slowly and, when the shunting path is first established, only a small portion of the inner surfaces of the connector are wetted. Since the electrical resistance of a conductive solution varies inversely with the wetted areas of the electrodes therein, the initial resistance of the solution is so high that even in the unpolarized state the resistance is far above the indicating resistance of the thermistor material. As additional moisture is introduced, the resistance of the solution tends to decrease, however, decrease in resistance is accompanied by a corresponding decrease in the voltage impressed thereacross which tends to increase the resistance to current flow through the solution. In this manner, the resistance stabilizes at some value which causes the voltage to be impressed thereacross to be within the polarizing region, and as the resistance of the material 19 decreases, decreasing the voltage impressed thereacross, the resistance of the solution increases.

In FIG. 3, there is shown a system arranged to carry out the present invention by impressing across the thermistor element a direct current potential of less than one volt when the element is at its fire indicating resistance. In this view, the element 12 is illustrated schematically, the conductors 15 and 16 being represented by connection points 15' and 16', and the resistance of the material 19 being represented by the variable resistance 19'. The resistance of the conductive solution within the chamber 39 (FIG. 1) is represented by the resistance Rs connected in parallel with the resistance 19' between the points 15' and 16'. The resistance 19', which in the present embodiment has a fire indicating value of less than 700 ohms, is connected in series with a 10,000 ohm resistor 40 across a 10 volt constant voltage direct current source 41. Also, a 3900 ohm resistor 42 and a 500 ohm resistor 44 connected in series to form a resistance bridge with the resistances 19' and 40 are connected across the source 41. The resistor 44 is provided with an adjustable tap 45, and the output of the bridge, which indicates the condition of the bridge with respect to balance, is sensed between the tap 45 and the point x at the junction of the resistances 19' and 40.

An NPN type junction transistor 46 having a base 47, an emitter 49, and a collector 50, has its input circuit connected across the bridge to sense the bridge output, the emitter 49 being connected to the tap 45 through a 10 ohm current limiting resistor 51 and the base 47 being connected to the point X. The collector 50 is connected to the positive side of the source 41 through a 10,000 ohm load resistor 52.

The output of the transistor 46 controls a second NPN type junction transistor 54 having a base 55 connected to the collector 50 of the transistor 46, an emitter 56 connected to the emitter 49 of the transistor 46 through a 470 ohm feedback resistor 57, and a collector 59 connected to the positive side of the source 41 through a relay winding 60 which controls a switch 61 in an external indicating circuit. The emitter 49 is also connected to the junction of a 910 ohm resistor 62 and a 270 ohm resistor 64 connected in series across the source 41.

In operation, the transistor 46 conducts whenever the potential at the point X is slightly more positive than the voltage at the tap 45. When the element 19 is at normal temperatures, its resistance is very high, wherefore the voltage impressed thereacross is substantial and the transistor 46 conducts holding the transistor 54 at cut off. The transistor 46 continues to conduct until the voltage at the point X drops to a value approximately equal to the voltage at the tap 45, at which time the transistor 54 goes into conduction to effect closing of the switch 61 to give an alarm.

The tap 45 is positioned in accordance with the indicating resistance of the element utilized so that the voltage thereat is approximately equal to that which appears at the point X when the resistance of the element 19' is at its indicating resistance in the absence of moisture.

By utilizing in this system a detecting element having an indicating resistance of less than 700 ohms in connection with the 10,000 ohm resistor 40 and the 10 volt source 41, the potential at the point X assumes a value of less than about 0.7 volt when the element 19 is at its indicating resistance. Therefore, any conductor having conductive moisture within its chamber 39 (FIG. 1) will be polarized and the resistance $R_s$ will be large and the effect of the resistance $R_s$ on the total resistance between the points 15' and 16' and upon the voltage at the point X is greatly minimized.

Although the present invention is described in connection with the system of the aforementioned patent, it is to be understood that the invention can be practiced by utilizing various other detecting systems, and systems of other types which include a variable resistance condition detecting element subject to contamination by moisture wherein the system is arranged so that the voltage impressed across the element is within the range which polarizes conductive solutions when the element is at its condition indicating resistance.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. In apparatus for detecting heat due to an abnormal temperature condition including a source of constant potential unidirectional current and a resistor and a heat detecting element connected in series across said source, said heat detecting element including a pair of spaced apart electrodes, one of which is connected to said resistor and the other of which is connected to one terminal of said source, and including a mass of thermistor composition between said electrodes and in electrical connection therewith to provide a conductive path between said electrodes, said composition having a negative temperature coefficient of resistivity of a value selected to provide said path with a high resistance at normal temperature conditions and to provide said path with a lower resistance at abnormal temperature conditions for effecting actuation of the apparatus, said electrodes being provided with connector means having a space therein through which said electrodes pass and said space being inherently subject to the entrance of moisture therein and between said electrodes which moisture behaves like an electrically conductive solution providing a second conductive path between said electrodes having a lower resistance than the first mentioned path at normal temperature conditions: the improvement which comprises said source being constructed and arranged to impress a given voltage across said resistor and said heat detecting element, and said resistor having a given resistance value and said heat detecting element composition providing said first mentioned path having a given resistance value when an abnormal temperature condition exists, said voltage and resistance values being of a magnitude to follow Ohm's law so that in the presence of moisture in said space a potential is impressed across said second path within the range of zero to about 1.2 volts when the abnormal temperature resistance value of said composition is approached which voltage causes the resistance of said second path to be maintained at a higher value than the resistance value of said first mentioned path to thereby prevent false actuation of the apparatus due to current flow through said second path.

2. In apparatus according to claim 1, wherein said source has a potential of 10 volts, said resistor has a resistance of 10,000 ohms and said first mentioned path having a resistance of less than about 700 ohms when an abnormal temperature condition exists so that a potential of less than about 0.7 volt is impressed across said second path.

References Cited in the file of this patent
UNITED STATES PATENTS 2,901,740     Cutsogeorge _____ Aug. 25, 1959